United States Patent
Verschuren

(10) Patent No.: US 7,224,644 B2
(45) Date of Patent: May 29, 2007

(54) HEAD ARRANGEMENT FOR DOMAIN EXPANSION MAGNETIC AMPLIFYING MAGNETO-OPTICAL SYSTEM

(75) Inventor: Coen Adrianus Verschuren, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 204 days.

(21) Appl. No.: 10/235,429

(22) Filed: Sep. 5, 2002

(65) Prior Publication Data
US 2003/0076750 A1 Apr. 24, 2003

(30) Foreign Application Priority Data
Sep. 6, 2001 (EP) ............................... 01203364

(51) Int. Cl.
*G11B 11/00* (2006.01)
(52) U.S. Cl. .................................. 369/13.23
(58) Field of Classification Search ............ 369/13.22, 369/13.23, 13.09, 13.08, 13.07, 13.06, 13.05, 369/13.17, 13.18, 13.19, 13.12, 13.2; 300/59; 428/694 ML, 694 MM
See application file for complete search history.

(56) References Cited

U.S. PATENT DOCUMENTS

| | | | | |
|---|---|---|---|---|
| 5,886,959 A * | 3/1999 | Bischoff et al. | ......... | 369/13.23 |
| 5,963,512 A * | 10/1999 | Inoue et al. | ............. | 369/13.09 |
| 6,122,228 A * | 9/2000 | Shimazaki et al. | ...... | 369/13.07 |
| 6,249,491 B1 * | 6/2001 | Makita | ..................... | 369/13.17 |
| 6,314,062 B1 * | 11/2001 | Suzuki et al. | ............ | 369/13.17 |
| 6,404,705 B1 * | 6/2002 | Watanabe et al. | ........ | 369/13.14 |
| 6,466,523 B1 * | 10/2002 | Ishii | ........................ | 369/13.12 |
| 6,477,118 B1 | 11/2002 | Awano et al. | ............ | 369/13.14 |
| 6,483,783 B1 | 11/2002 | Mitani et al. | ............ | 369/13.15 |
| 6,657,926 B2 * | 12/2003 | Burroughs | ............... | 369/13.22 |
| 6,700,837 B2 * | 3/2004 | Verschuren | .............. | 369/13.09 |

FOREIGN PATENT DOCUMENTS

| | | |
|---|---|---|
| JP | 260079 A | 9/2000 |
| WO | WO9848418 | 10/1998 |
| WO | WO9956277 | 4/1999 |
| WO | WO9924970 | 5/1999 |

OTHER PUBLICATIONS

Patent Abstracts of Japan, Nakatani Morio: "Magneto-Optical disk Device, And Reproducing Method" Publication No. 2001148143, May 29, 2001, Application No. 11329022, Nov. 19, 1999.

Penning et al: An integrated magneto-optical sliding head for first surface laser pulsed magnetic field modulation magneto-optical-recording 10th International Symposium On Optical Memory 2000, Sep. 5-8, 2000, vol. 40, No. 3b, pp. 1775-1777, Japanese Journal of Applied Physics, Part 1, Mar. 2001, Japan Soc. Appl. Phys, Japan.

* cited by examiner

*Primary Examiner*—Tan Dinh

(57) ABSTRACT

A head arrangement for reading a magneto-optical recording medium (10) having a storage layer and a read-out layer, includes an improved field generating device for generating a magnetic field used for copying a written mark from said storage layer to said read-out layer upon laser heating, the field generating device being arranged to generate a predetermined field gradient and/or a predetermined local maximum in a field component perpendicular to the surface of the recording medium (10). The width of the spatial overlap can thus be reduced such that an improved resolution and/or power margin is obtained.

16 Claims, 5 Drawing Sheets

HEAD ARRANGEMENT FOR DOMAIN EXPANSION MAGNETIC AMPLIFYING MAGNETO-OPTICAL SYSTEM

BACKGROUND OF THE INVENTION

1. Field of the Invention

The present invention relates to a head arrangement and apparatus for reading information from a magneto-optical recording medium, such as a MAMMOS (Magnetic AMplifying Magneto-Optical System) disk, comprising a recording or storage layer and an expansion or read-out layer.

2. Description of the Related Art

In magneto-optical storage systems, the minimum width of the recorded marks is determined by the diffraction limit, i.e., by the Numerical Aperture (NA) of the focussing lens and the laser wavelength. A reduction of the width is generally based on shorter wavelength lasers and higher NA focussing optics. During magneto-optical recording, the minimum bit length can be reduced to below the optical diffraction limit by using Laser Pulsed Magnetic Field Modulation (LP-MFM). In LP-MFM, the bit transitions are determined by the switching of the field and the temperature gradient induced by the switching of the laser. For read-out of the small crescent shaped marks recorded in this way, Magnetic Super Resolution (MSR) or Domain Expansion (DomEx) methods have to be used. These technologies are based on recording media with several magneto-static or exchange-coupled RE-TM layers. According to MSR, a read-out layer on a magneto-optical disk is arranged to mask adjacent bits during reading while, according to domain expansion, a domain in the center of a spot is expanded. The advantage of the domain expansion technique over MSR has the result that bits with a length below the diffraction limit can be detected with a similar signal-to-noise ratio (SNR) as bits with a size comparable to the diffraction limited spot. MAMMOS is a domain expansion method based on magneto-statically coupled storage and read-out layers, wherein a magnetic field modulation is used for expansion and collapse of expanded domains in the read-out layer.

In the above-mentioned domain expansion techniques, like MAMMOS, a written mark from the storage layer is copied to the read-out layer upon laser heating with the help of an external magnetic field. Due to the low coercivity of this read-out layer, the copied mark will expand to fill the optical spot and can be detected with a saturated signal level which is independent of the mark size. Reversal of the external magnetic field collapses the expanded domain. A space in the storage layer, on the other hand, will not be copied and no expansion occurs.

The MAMMOS technique has the great advantage that very small marks can be reproduced with a saturated signal. The margin in laser power, however, decreases strongly with decreasing mark size and thus limits the resolution due to the following effects. If the power is too low, no signal is observed, and if the power is too high, false signals from neighboring bits cause erroneous read-out.

Conventional ways to enhance the power margin/resolution are to use a smaller optical spot (shorter wavelength, larger NA) and materials with optimized temperature dependency of the magnetic properties.

SUMMARY OF THE INVENTION

It is an object of the present invention to provide a head arrangement and an apparatus for reading from a domain expansion recording medium by means of which resolution and/or the power margin can be improved.

This object is achieved by a head arrangement for reading a magneto-optical recording medium comprising a storage layer and a read-out layer, said arrangement comprising field generating means for generating a magnetic field used for copying a written mark from said storage layer to said read-out layer upon laser heating so as, to obtain an expanded domain in said read-out layer, said field generating means being arranged to generate a predetermined field gradient and/or a predetermined local maximum in a field component perpendicular to the surface of said recording medium, and by an apparatus comprising such a head arrangement.

Accordingly, the predetermined gradient and/or local maximum leads to a reduction in the width of the spatial overlap between the coercivity profile of the recording medium and the stray field. Thereby, resolution and/or power margin can be increased.

BRIEF DESCRIPTION OF THE DRAWINGS

The present invention will be described hereinafter on the basis of preferred embodiments and with reference to the accompanying drawings, in which.

DESCRIPTION OF THE PREFERRED EMBODIMENTS

Figure 1:
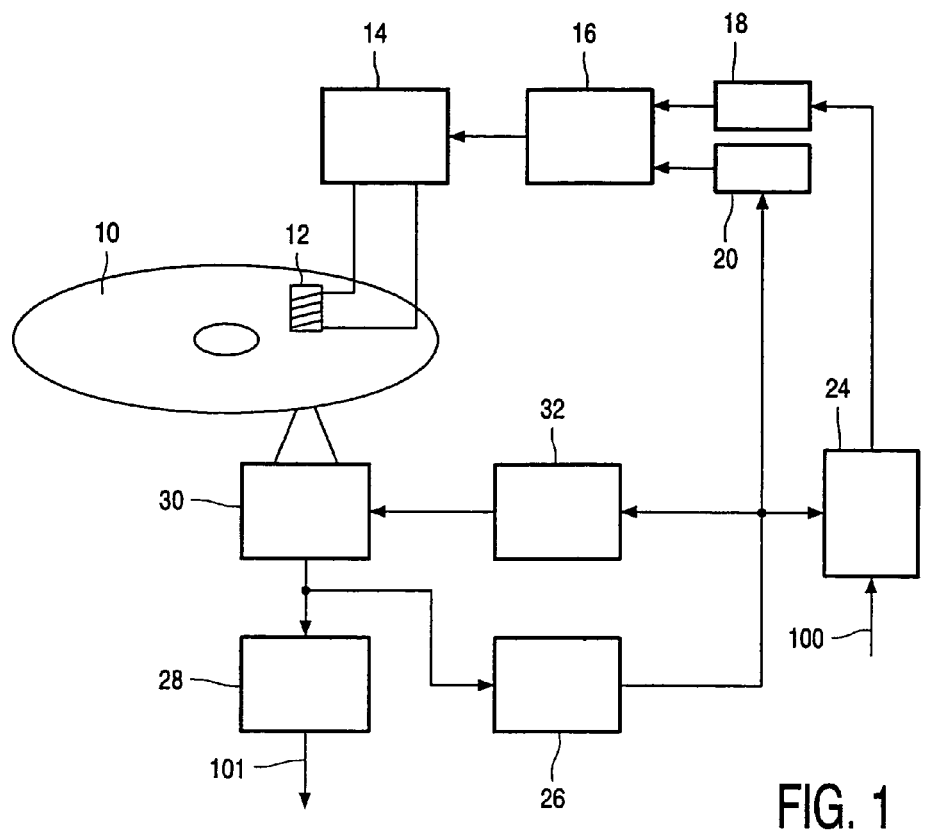
FIG. 1 shows a diagram of a magneto-optical disk player according to the preferred embodiment.

The preferred embodiments will now be described on the basis of a MAMMOS disk player as indicated in FIG. 1. FIG. 1 schematically shows the construction of the disk player according to the preferred embodiments. The disk player comprises an optical pick-up unit 30 having a laser light radiating section for irradiation of a magneto-optical recording medium 10, such as a magneto-optical disk, with light that has been converted, during recording, to pulses with a period synchronized with code data, and also having a magnetic field applying section comprising a magnetic head 12 with a coil, or coil arrangement, for applying a magnetic field to the magneto-optical recording medium 10 in a controlled manner at the time of recording and playback. In the optical pick-up unit 30, a radiation source, e.g., a laser, is connected to a laser driving circuit which receives recording and read-out pulses from a recording/read-out pulse adjusting unit 32 to thereby control the pulse amplitude and timing of the radiation source of the optical pick-up unit 30 during a recording and read-out operation. The recording/read-out pulse adjusting circuit 32 receives a clock signal from a clock generator 26 which may comprise a PLL (Phase-Locked Loop) circuit. It is to be noted that, for reasons of simplicity, the magnetic head 12 and the optical pick-up unit 30 are shown on opposite sides of the disk 10. However, according to the preferred embodiment, they are preferably arranged on the same side of the disk 10.

The magnetic head 12 is connected to a head driver unit 14 and receives, at the time of recording, code-converted data via a phase adjusting circuit 18 from a modulator 24. The modulator 24 converts input recording data 100 to a prescribed code.

At the time of playback, the head driver 14 receives a clock signal via a playback adjusting circuit 20 from the clock generator 26, wherein the playback adjusting circuit 20 generates a synchronization signal for adjusting the timing and amplitude of pulses applied to the magnetic head 12. A recording/playback switch 16 is provided for switching or selecting the respective signal to be supplied to the head driver 14 at the time of recording and at the time of playback.

Furthermore, the optical pick-up unit 30 comprises a detector for detecting laser light reflected from the magneto-optical recording medium 10 and for generating a corresponding reading signal which is applied to a decoder 28 which is arranged to decode the reading signal to generate output data 101. Furthermore, the reading signal generated by the optical pick-up unit 30 is applied to the clock generator 26 in which a clock signal is extracted from embossed clock marks of the magneto-optical recording medium 10, and which supplies the clock signal for synchronization purposes to the recording pulse adjusting circuit 32, the playback adjusting circuit 20, and the modulator 24. In particular, a data channel clock may be generated in the PLL circuit of the clock generator 26.

In the case of data recording, the laser of the optical pick-up unit 30 is modulated with a fixed frequency corresponding to the period of the data channel clock, and the data recording area or spot of the rotating magneto-optical recording medium 10 is locally heated at equal distances. Additionally, the data channel clock output by the clock generator 26 controls the modulator 24 to generate a data signal with the standard clock period. The recording data are modulated and code-converted by the modulator 24 to form a binary run length information corresponding to the information of the recording data.

The structure of the magneto-optical recording medium 10 may correspond to the structure described in the JP-A-2000-260079.

Recording experiments on MAMMOS disks have shown that, for the highest resolution, it is necessary to use a spatial offset between the laser spot and the magnetic field coil. This offset is such that the laser spot is located near the edge of the field coil. An explanation for this observation is that an in-plane field component parallel to the surface of the read-out layer suppresses nucleation on one edge of a mark, while nucleation on the other edge is enhanced, thus improving the resolution. Recent angle-dependent VSM measurements show, however, that only the perpendicular field-component is important for switching the magnetization direction.

Figure 2:
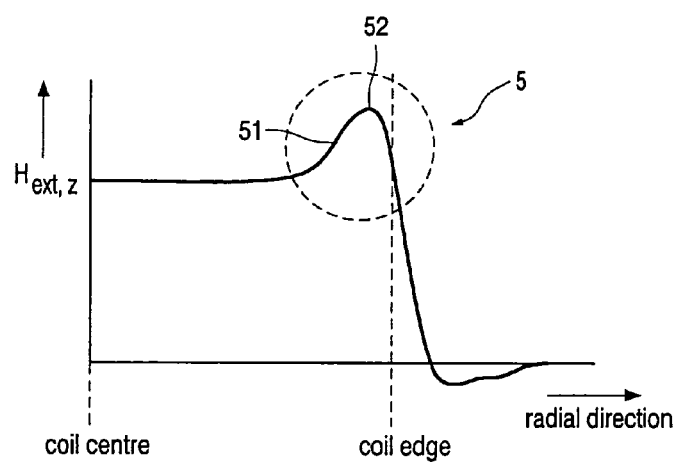
FIG. 2 shows a characteristic of a perpendicular component of an external magnetic field generated by a typical coil arrangement.

FIG. 2 shows the perpendicular component $H_{ext,z}$ of the external magnetic field profile of a typical substantially circular coil arrangement versus the radial direction. It is clear that the field is non-uniform near the coil edge. Therefore, regions 5 with a gradient 51 and a local maximum 52 can be distinguished. These regions can be used for enhancing read-out resolution.

The reasons for this enhanced resolution will be discussed hereinafter with reference to FIGS. 3A to 3C which showing characteristics of the coercive field of the read-out layer during laser heating, the stray field generated by mark regions in the storage layer under the assumption of a constant magnetization within the mark regions, and the external field generated by the coil arrangement of the magnetic head 12. For simplicity, the temperature dependency of the magnetization of the storage layer (affecting the stray field) has been neglected.

Figure 3A:
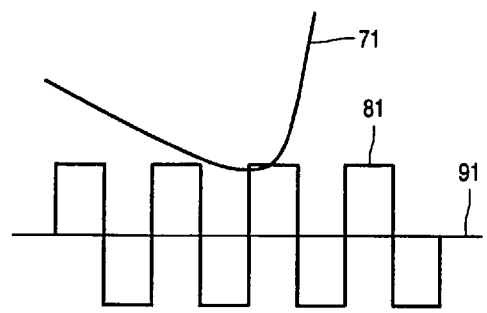
FIG. 3A shows characteristics of the coercive field of the read-out layer, the stray field of marks provided in the storage layer, and the external field applied by a coil arrangement with a conventional uniform field characteristic.

FIG. 3A shows the characteristics in the case of a conventional coil arrangement with a uniform field characteristic 91. The overlap region is determined by the crossings of the coercive field characteristic 71 with the stray field characteristic 81 from the marks.

Figure 3B:
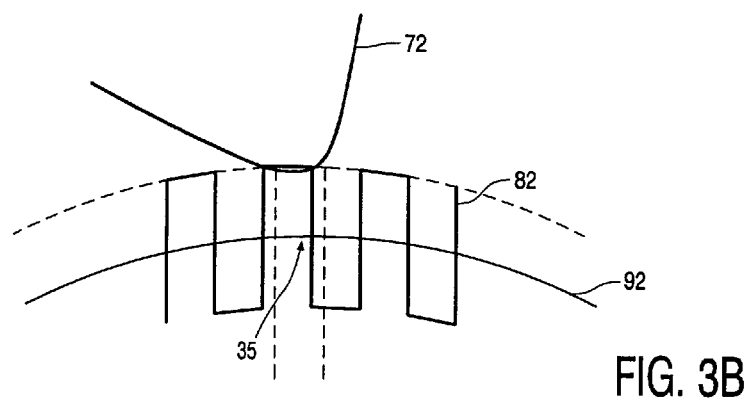
FIG. 3B shows characteristics of the coercive field of the read-out layer, the stray field of marks provided in the storage layer, and the external field applied by a coil arrangement with a field characteristic having a field maximum according to a first preferred embodiment.

FIG. 3B shows an external field characteristic 92 of a coil arrangement according to a first preferred embodiment with a maximum 35 at the location of the lowest coercive field 72, i.e., the hottest part of the optical spot of the laser, and decreasing towards larger distances. This characteristic will reduce the spatial overlap and will thus suppress reproduction of neighboring marks due to the fact that nucleation only occurs if the sum of the local stray field 82 and the local external field 92 is larger than the local coercive field 72. Numerical simulations showed that even a slight curvature has a large effect. This was confirmed by recorder experiments where a significant resolution improvement was observed although the field profile near the edge of the field coil used (250 μm diameter) was 'nearly uniform' on the scale of the optical spot (~0.6 μm). It is to be noted that the effect of a strong temperature dependency of the magnetization leads to a similar result, that is, contributions from neighboring bits (mark regions) are suppressed.

Figure 3C:
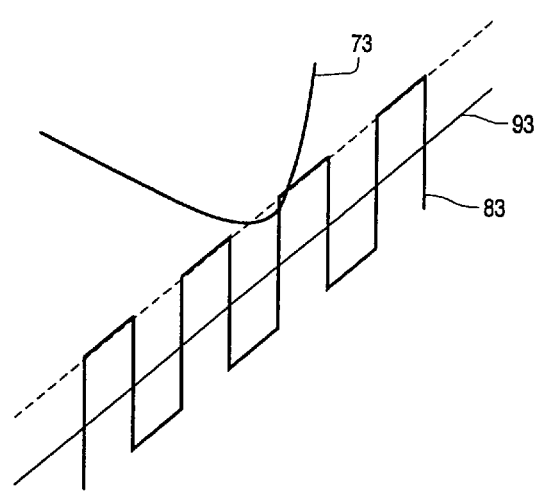
FIG. 3C shows characteristics of the coercive field of the read-out layer, the stray field of marks provided in the storage layer, and the external field applied by a coil arrangement with a field characteristic having a field gradient according to a second preferred embodiment.
Figure 4:
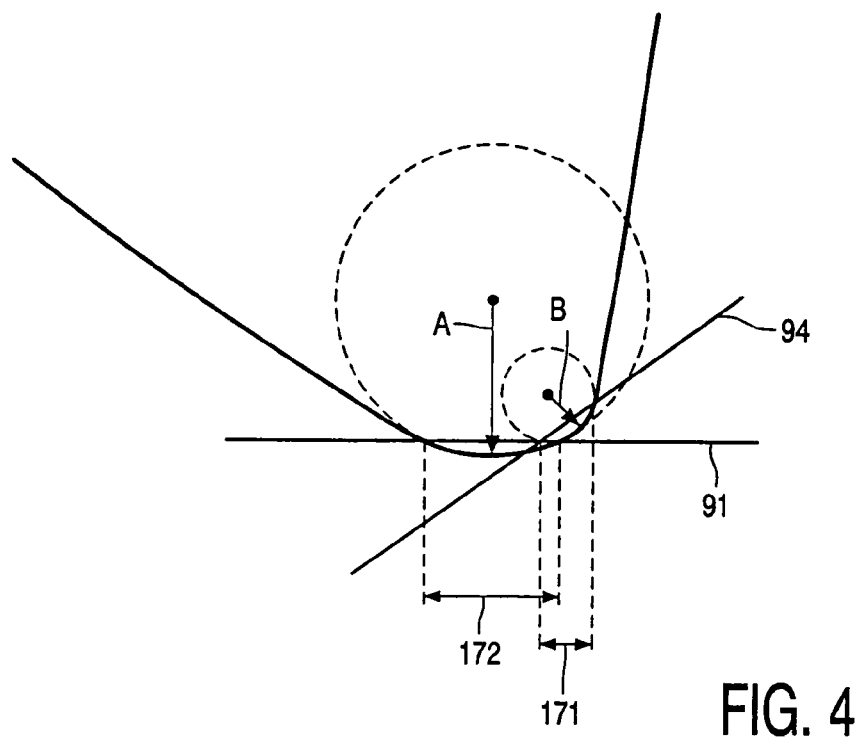
FIG. 4 shows a diagram indicating a reduction of the spatial overlap between the coercive field and the stray field due to an external field with a field gradient according to the second preferred embodiment.

FIG. 3C shows an external field characteristic 93 of a coil arrangement according to a second preferred embodiment with a gradient which is not zero and thus also leads to a reduced spatial overlap between the coercive field 73 and the stray field 83 of the recorded marks due to the asymmetric shape of the coercivity profile. This asymmetric shape results from the movement of the disk, leading to an asymmetric thermal profile in the read-out layer. FIG. 4 shows a diagram indicating the change of the spatial overlap caused by the gradient. Due to the strong temperature increase at the front of the spot, a local curvature with a minimum radius B occurs. This radius B is smaller than the minimum radius A which occurs in the hottest part of the spot. Since the radius is a measure for the overlap with the stray field, a gradient in the external field 94 will result in an enhanced resolution/power margin. The overlap 171 for an external field 94 having a gradient not equal to zero is significantly smaller than the overlap 172 for a uniform external field 91.

Both local maximum characteristics and gradient field characteristics can be used to design coil arrangements comprising a (combination of) field coil(s) and/or soft or permanent magnetic layers offering a significant improvement in resolution. It is to be noted that a sufficiently large external field is required over a distance of, preferably, at least the optical spot size to enable domain expansion to fill (a large part of) the spot. Practical implementations of coil arrangements according to embodiments of the invention will be described hereinafter with reference to FIG. 5 and FIGS. 6A to 6G, respectively. It is to be noted that throughout the above figures, the coil windings are simplified as concentric circles. However, in practice, the coil windings are connected or adapted to obtain a spiral-shaped winding pattern.

In general, coil configurations with very localized fields show large improvements. However, simpler structures, either as a separate coil configuration or integrated with some optical component, may be sufficient for good results. A sufficient field required for expansion and collapse should be provided over a region of approximately the size of the optical laser spot. Furthermore, a region substantially smaller than this region of approximately the size of the optical laser spot should contain the local maximum or gradient.

Figure 5:
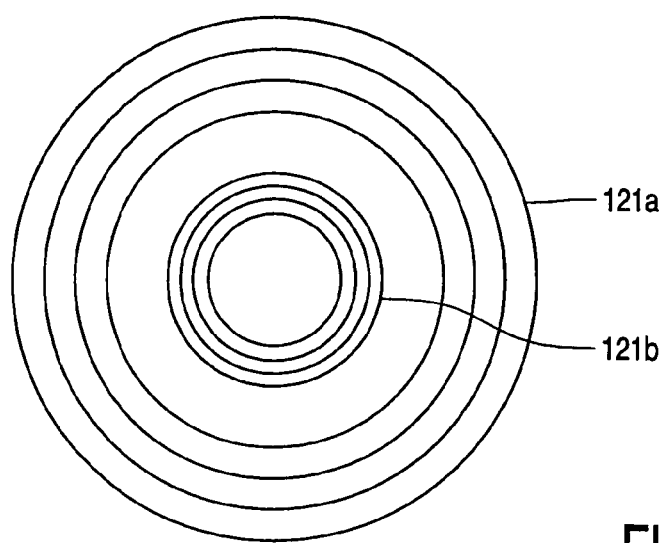
FIG. 5 shows a dual coil arrangement according to the first preferred embodiment.

FIG. 5 shows a dual coil arrangement where a large primary coil 121a (for example, a ferrite core coil or a thin film coil in a slider) is provided for expansion and collapse of the domain in the read-out layer and a small secondary coil 121b (for example, a narrow pole tip) is concentrically provided for generating the maximum in the field characteristic, for example, at the center of the laser spot, and thus for precise selection and nucleation of the marks. Alternatively, the dual coil arrangement may be adapted to generate a predetermined field gradient which is not zero, for example, by providing a predetermined coil displacement (eccentricity), coil or core shape, or change in winding density.

Both coils of FIG. 5 may be driven by the head driver 14 as one coil. However, for writing, it may be advantageous to use only the larger primary coil 121a.

Other practical implementations for the coil arrangement with the maximum in the field characteristic may comprise only one small coil and/or pole diameter, wherein the pole may consist of a core made of, for example, a soft magnetic or soft ferrite material, a coil with a tapered core (for example, shaped like a cone with the peak pointing towards the disk 10), or a combination of the above implementations.

Furthermore, coil arrangements with a core of, for example, a ferrite could either be placed on the opposite side of the disk as the focussing lens, or could be placed side by side with the optical pick-up unit 30. The latter may be difficult to achieve, unless a kind of optical wave guiding structure is integrated with the coil arrangement. Other arrangements with a transparent coil center can be used on the same side of the disk 10, provided that the diameter of the center is large enough to allow the focussed laser light to pass. If not, the same applies as for configurations with a core.

Figure 6A:
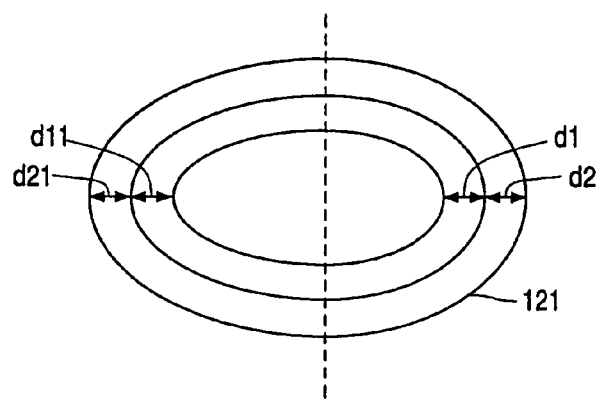
FIGS. 6A to 6G show coil arrangements according to the second preferred embodiment.

FIG. 6A shows a coil arrangement with a gradient characteristic comprising asymmetric windings 121. This asymmetry is achieved, for example, by a difference in the winding density between the left and right side of the coil. In regions with reduced density, the windings can be made wider or thicker so as to reduce resistance loss. Thus, the field gradient is achieved by an increased field density towards the side of the higher winding density. In particular, as indicated in FIG. 6A, winding distances d11 and d21 on the left side and winding distances d1 and d2 on the right side may be adapted such that the ratios d21/d2 and d11/d1 are larger than one, while d21 is larger than d11.

Figure 6B:
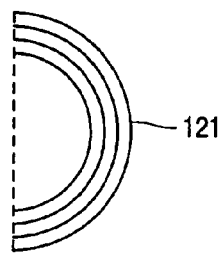

FIG. 6B shows an extreme case of a gradient characteristic achieved by a half-coil arrangement. The half-coil arrangement may advantageously be provided on a slider (not shown) wherein the coil windings 121 are closed by providing a back path (dotted line in FIG. 6B) through the same side or through the opposite side of the slider. Such a half-coil arrangement enables a comparatively large coil which produces the largest field at the edge of the slider which is closest to the disk. However, the strength of the field is reduced by a factor of 2 compared to a normal full-coil, this is not always practical.

Figure 6C:
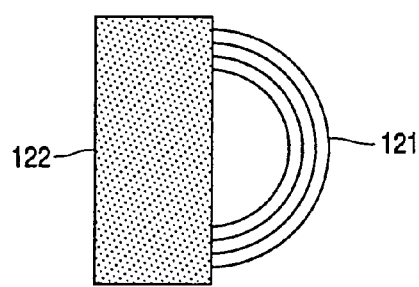
Figure 6D:
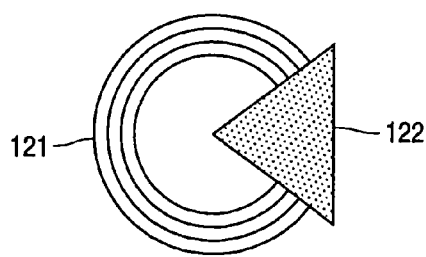

FIGS. 6C and 6D show coil arrangements with a gradient characteristic achieved by partially covering a conventional (rotationally symmetric) coil with a shielding or flux concentration layer 122 to shield or deflect a part of the field generated by the windings 121. This shielding or flux concentration layer 122 may be structured with a rectangular shape (FIG. 6C) or a triangular shape (FIG. 6D) (e.g., using lithography) to optimize the field distribution. The shielding or flux concentration layer 122 may be made of a soft magnetic material or a structured permanent magnetic material. It is to be noted that the shielding or flux concentration layer may have any shape and may even be implemented as a grid suitable to generate the predetermined field characteristics.

Figure 6E:
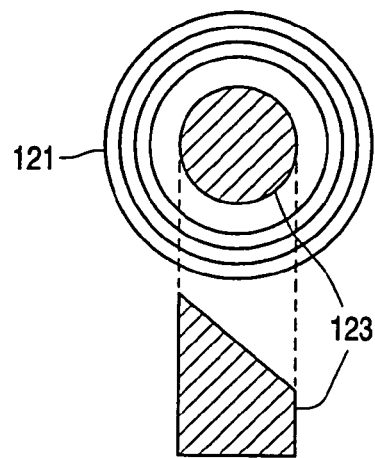
Figure 6F:
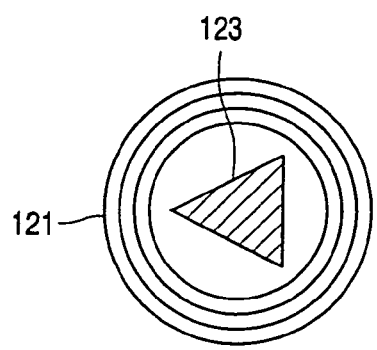
Figure 6G:
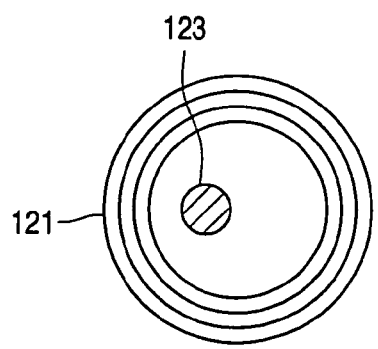

FIGS. 6E to 6G show coil arrangements with a shaped core 123 as the core of the coil with an asymmetric cross section (indicated in an additional sideview in FIG. 6E). The shaped core 123 may have an additional conical shape such that a small peak of the asymmetric conical core points towards the disk 10. As an alternative, the core 123 may be arranged with a triangular cross section (FIG. 6F) or as a cylindrical core (FIG. 6G), both positioned eccentrically in the windings 121, to achieve the desired non-zero field gradient.

It is to be noted that any combination of local maximum and gradient field structures is possible. Especially, a dual coil-like arrangement may be advantageous in all the above cases.

The present invention can be applied to any field generating means for domain expansion magneto-optical disk players or storage systems in order to provide an optimized field characteristic. These field generating means include a coil arrangement, a non-coil hard magnetic arrangement or any combination or other arrangement for generating a magnetic field with a prescribed field characteristic. In particular, the coil arrangement may be combined with a small eccentric or non-eccentric permanent magnet to achieve the desired local maximum or non-zero gradient field characteristic. The use of the permanent magnet, enables a reduction of the power consumption and complexity of the driving circuits.

The above preferred embodiments may vary within the scope of the attached claims. In the claims, laser heating should be understood as heating caused by any type of radiation and not be limited to radiation by a laser emitting visible light.

The invention claimed is:

1. A head arrangement for reading a magneto-optical recording medium having a storage layer and a read-out layer, said head arrangement comprising;

field generating means for generating an external magnetic field for copying a written mark from said storage layer to said read-out layer upon laser heating to form an expanded domain in said read-out layer, wherein said field generating means generates, in said external magnetic field, a predetermined local maximum in a field component perpendicular to the surface of said recording medium, said field generating means comprising a coil arrangement with a coil diameter, said predetermined local maximum being generated at said coil diameter, said coil arrangement being offset with respect to a laser spot of said laser heating such that said predetermined local maximum is located at a position corresponding to the laser spot of said laser heating.

2. The head arrangement as claimed in claim 1, wherein said coil arrangement is a dual coil arrangement.

3. A head arrangement for reading a magneto-optical recording medium having a storage layer and a read-out layer, said head arrangement comprising:

field generating means, comprising a dual coil arrangement, for generating a magnetic field for copying a written mark from said storage layer to said read-out layer upon laser heating to form an expanded domain in said read-out layer, wherein said field generating means generates a predetermined local maximum in a field component perpendicular to the surface of said recording medium, wherein said dual coil arrangement comprises a larger first coil for expansion and collapse of said expanded domain, and a smaller second coil for generating said predetermined local maximum.

4. The head arrangement as claimed in claim 1, wherein said coil arrangement comprises a tapered core.

5. The head arrangement as claimed in claim 1, wherein said coil arrangement comprises an asymmetric winding for generating said predetermined field gradient.

6. The head arrangement as claimed in claim 5, wherein said asymmetric winding is achieved by a difference in the winding density.

7. The head arrangement as claimed in claim 1, wherein said coil arrangement comprises a half-coil arrangement for generating said predetermined local maximum.

8. The head arrangement as claimed in claim 7, wherein said half-coil arrangement is provided on a slider.

9. The head arrangement as claimed in claim 1, wherein said coil arrangement is partially covered by flux concentration means.

10. The head arrangement as claimed in claim 9, wherein said flux concentration means comprises a flux concentration layer of a rectangular or triangular shape.

11. The head arrangement as claimed in claim 1, wherein said coil arrangement comprises an eccentric core.

12. The head arrangement as claimed in claim 11, wherein said eccentric core has a triangular cross section.

13. The head arrangement as claimed in claim 1, wherein said coil arrangement comprises a shaped core with an asymmetric cross section.

14. An apparatus for reading information from a magneto-optical recording medium having a storage layer and a read-out layer, said apparatus comprising a head arrangement as claimed in claim 1.

15. The apparatus as claimed in claim 14, wherein said apparatus is a disk player for MAMMOS disks.

16. An apparatus for reading information from and writing information to a magneto-optical recording medium having a storage layer and a read-out layer, said apparatus comprising a head arrangement as claimed in claim 2, said dual coil arrangement having a first and a second coil, wherein said apparatus is arranged to use both of said first and second coils of the dual coil arrangement for a reading operation, and only one of said first and second coils for a writing operation.

* * * * *